(12) United States Patent
Lee (10) Patent No.: US 12,552,299 B2
(45) Date of Patent: Feb. 17, 2026

(54) RECLINING DEVICE FOR VEHICLE SEAT (71) Applicant: Hyundai Transys Inc., Seosan-si (KR)

(72) Inventor: Young Sun Lee, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 286 days.

(21) Appl. No.: 18/470,586

(22) Filed: Sep. 20, 2023

(65) Prior Publication Data

US 2024/0166094 A1 May 23, 2024

(30) Foreign Application Priority Data

Nov. 23, 2022 (KR) .......................... 10-2022-0157978

(51) Int. Cl.
*B60N 2/235* (2006.01)
*B60N 2/22* (2006.01)

(52) U.S. Cl.
CPC ......... *B60N 2/2362* (2015.04); *B60N 2/2227* (2013.01)

(58) Field of Classification Search
CPC ... B60N 2/2362; B60N 2/2227; B60N 2/2257
See application file for complete search history.

(56) References Cited

U.S. PATENT DOCUMENTS

| | | | |
|---|---|---|---|
| 8,678,154 B2 * | 3/2014 | Kim ....................... | B60N 2/167 192/223.2 |
| 11,708,012 B2 * | 7/2023 | Mikasa ................ | B60N 2/1615 297/344.12 |
| 2017/0253149 A1 | 9/2017 | Chae et al. | |

FOREIGN PATENT DOCUMENTS

| | | |
|---|---|---|
| DE | 102020101684 A1 | 7/2021 |
| KR | 10-2014-0053075 A | 5/2014 |
| KR | 10-2019-0078377 A | 7/2019 |
| KR | 10-2022-0031406 A | 3/2022 |

OTHER PUBLICATIONS

Aurelien Petiaud, "Extended European Search Report for EP Application No. 23198477.4", Mar. 20, 2024, EPO, Germany.

* cited by examiner

*Primary Examiner* — Milton Nelson, Jr.
(74) *Attorney, Agent, or Firm* — Bridgeway IP Law Group, PLLC; Jihun Kim (57) ABSTRACT

A reclining device for a vehicle seat includes a housing having one side opened to communicate with an interior of the housing, a clutch drum inserted into the housing, configured to be rotatable, and having one side directed toward the housing and opened to communicate with an interior of the clutch drum, a cam inserted into the clutch drum and configured to receive a rotational force from the outside of the housing and transmit the rotational force to the clutch drum, and a brake drum configured to receive the rotational force from the clutch drum and having a center to which a shaft is coupled, in which a plurality of coupling protrusions is provided on one surface of the cam directed toward the housing, and the coupling protrusions penetrate the other side of the housing and are inserted into coupling holes of a lever bracket.

10 Claims, 14 Drawing Sheets

RECLINING DEVICE FOR VEHICLE SEAT

CROSS-REFERENCE TO RELATED APPLICATIONS

This application claims priority to and the benefit of Korean Patent Application No. 10-2022-0157978 filed in the Korean Intellectual Property Office on Nov. 23, 2022, the entire contents of which are incorporated herein by reference.

TECHNICAL FIELD

The present invention relates to a reclining device for a vehicle seat.

BACKGROUND ART

In general, a seat mounted in a vehicle includes a seatback configured to support a passenger's upper body, a seat cushion configured to support the passenger's lower body such as the passenger's buttocks and thighs, and a headrest configured to support the passenger's occiput. A reclining device, which is capable of adjusting an angle of the seatback with respect to the seat cushion, may be mounted at a portion where the seatback and the seat cushion are connected.

The reclining devices may be classified into a dial-type reclining device, a manual-type reclining device configured to adjust an angle of a seatback when a passenger manipulates a lever, and a power-type reclining device configured to operate automatically with power of a motor when a passenger manipulates a switch.

However, the dial-type reclining device, which adjusts an angle of a seatback by rotating a dial knob, is less convenient to use than a lever-type reclining device.

DOCUMENT OF RELATED ART

Patent Document (Patent Document 1) Korean Patent Application Laid-Open No. 10-2019-0078377 (published on Jul. 4, 2019)

SUMMARY OF THE INVENTION

The present invention has been made in an effort to provide a reclining device for a vehicle seat, in which an angle of a seatback may be adjusted when torque is inputted to a lever bracket by an operation of a lever, and a rotation of a brake drum may be restricted by a holder when torque is reversely inputted to a shaft coupled to the brake drum.

An exemplary embodiment of the present invention provides a reclining device for a vehicle seat, the reclining device including: a housing having one side opened to communicate with an interior of the housing; a clutch drum inserted into the housing, configured to be rotatable, and having one side directed toward the housing and opened to communicate with an interior of the clutch drum; a cam inserted into the clutch drum and configured to receive a rotational force from the outside of the housing and transmit the rotational force to the clutch drum; and a brake drum configured to receive the rotational force from the clutch drum and having a center to which a shaft is coupled, in which a plurality of coupling protrusions is provided on one surface of the cam directed toward the housing, and the coupling protrusions penetrate the other side of the housing and are inserted into coupling holes of a lever bracket.

Elastic members, which each have rollers provided at two opposite sides thereof, may be arranged along an inner/outer periphery of the clutch drum so as to surround an outer periphery of the cam.

A plurality of protrusions may be provided in the housing, and the protrusions may be positioned between the elastic members.

Protruding portions may be provided along the outer periphery of the cam, and when the cam rotates, the protruding portions may press the rollers of the elastic members positioned in a rotation direction, such that the elastic members are compressed.

A plurality of assembling protrusions may be provided on the other surface of the clutch drum directed toward the brake drum, and the assembling protrusions may be inserted into assembling grooves formed along an outer periphery of the brake drum.

A holder, which has two opposite sides surrounded by first and second supporters, may be positioned between the clutch drum and the brake drum, and two opposite ends of the holder may be configured as first and second ends bent toward inner centers of the first and second supporters.

Assembling grooves may be provided along outer peripheries of the first and second supporters, and the assembling protrusions of the clutch drum may be inserted into the assembling grooves of the first and second supporters.

When the clutch drum rotates, the assembling protrusion may press any one of the first and second ends so that a distance between the first and second ends decreases.

Catching protrusions may be provided on a surface of the brake drum directed toward the clutch drum, and the catching protrusions may be positioned between the first and second ends of the holder.

When the brake drum, which receives a rotational force from the shaft when torque is transmitted to the shaft, rotates, the catching protrusion positioned between the first and second ends may be caught by any one of the first and second ends, such that the rotation is restricted.

A cover may be coupled to one side of the housing in a state in which the clutch drum and the brake drum are coupled in the housing.

Through-holes, to which the shaft is penetratively coupled, may be provided at a center of the lever bracket, a center of the housing, a center of the cam, a center of the clutch drum, and a center of the cover.

According to the present invention, the angle of the seatback may be adjusted when torque is inputted to the lever bracket by the operation of the lever, and the rotation of the brake drum may be restrained by the holder when torque is reversely inputted to the shaft coupled to the brake drum.

The present invention may provide the lever-type reclining device capable of providing the occupant in the vehicle with the convenience of the reclining operation.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 1:
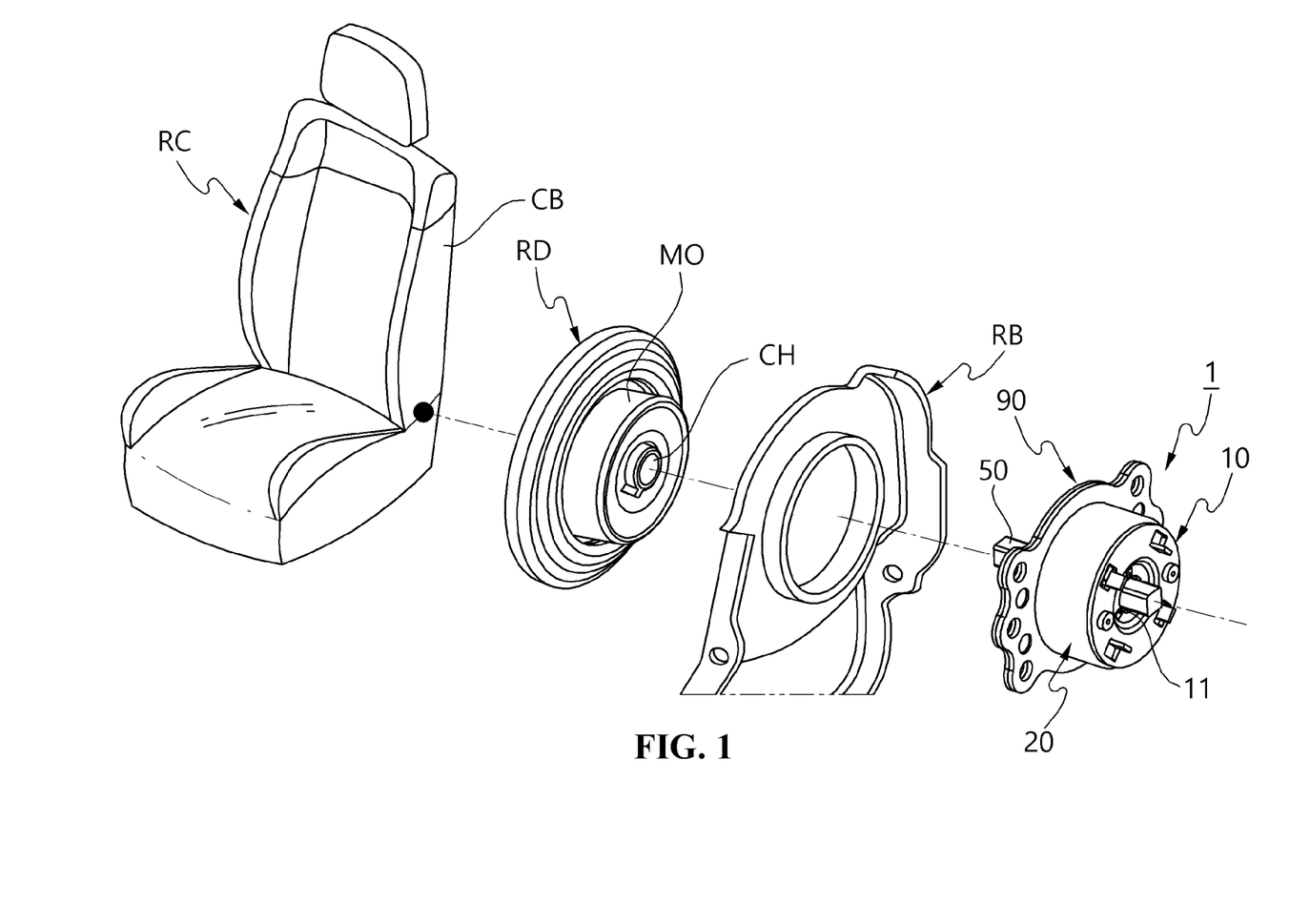
FIG. 1 is a perspective view illustrating a reclining device for a vehicle seat according to an exemplary embodiment of the present invention.

FIG. 1 is a perspective view illustrating a reclining device for a vehicle seat according to an exemplary embodiment of the present invention.

As illustrated in FIG. 1, a reclining device 1 for a vehicle seat of the present invention may be mounted on a seatback CB of a recliner RC by means of a recliner dial RD and a recliner bracket RB.

The recliner dial RD may have a mounting part MO protruding from one side surface directed toward the recliner bracket RB, and a center hole CH may be provided at a center of the mounting part MO.

The mounting part MO of the recliner dial RD may be penetratively coupled to the recliner bracket RB, and a part of a shaft 50, which is exposed while penetrating a cover 90, may be coupled to the center hole CH of the mounting part MO.

Figure 2:
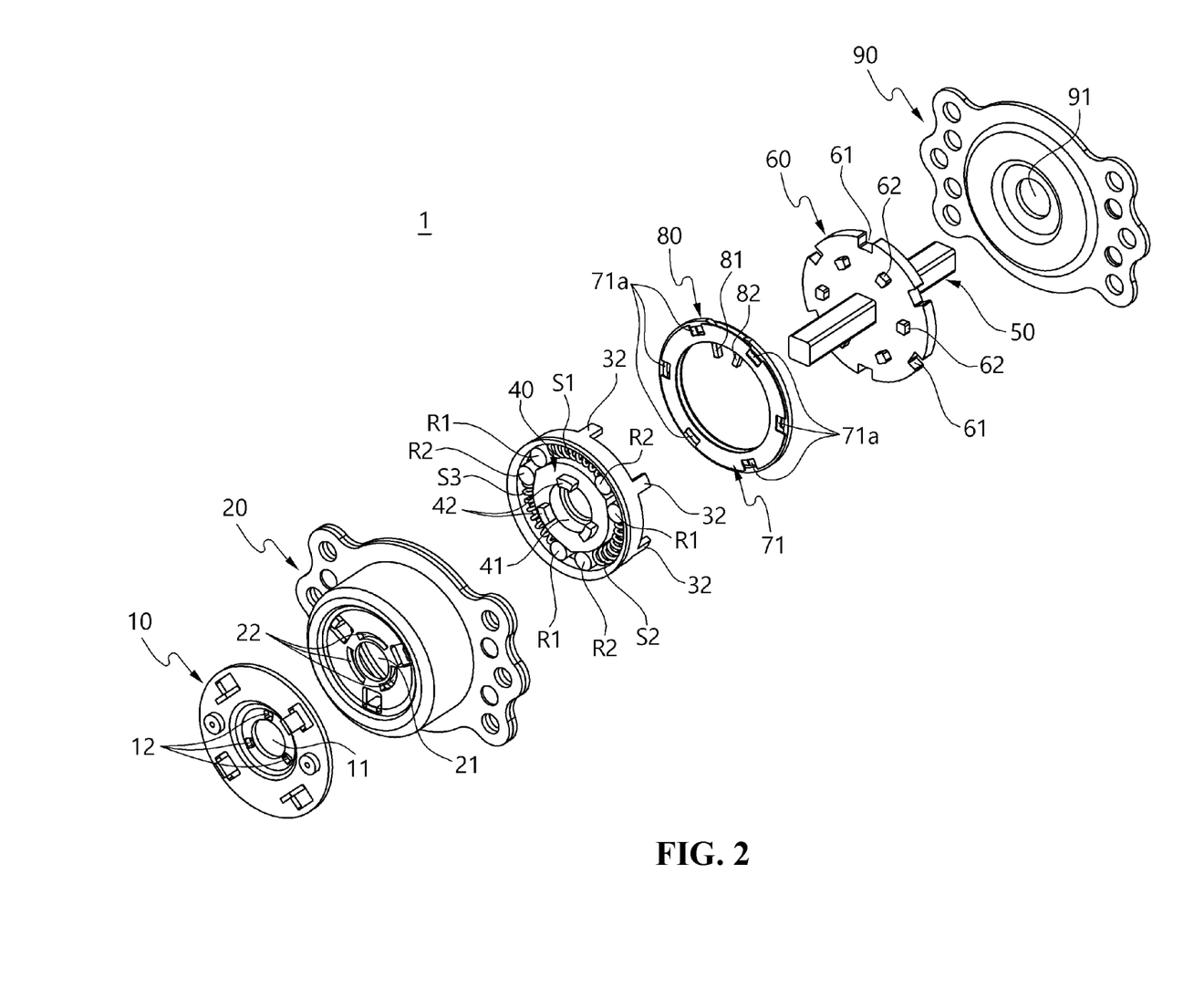
FIG. 2 is an exploded perspective view of the reclining device for a vehicle seat according to the exemplary embodiment of the present invention when viewed from a lever bracket.
Figure 3:
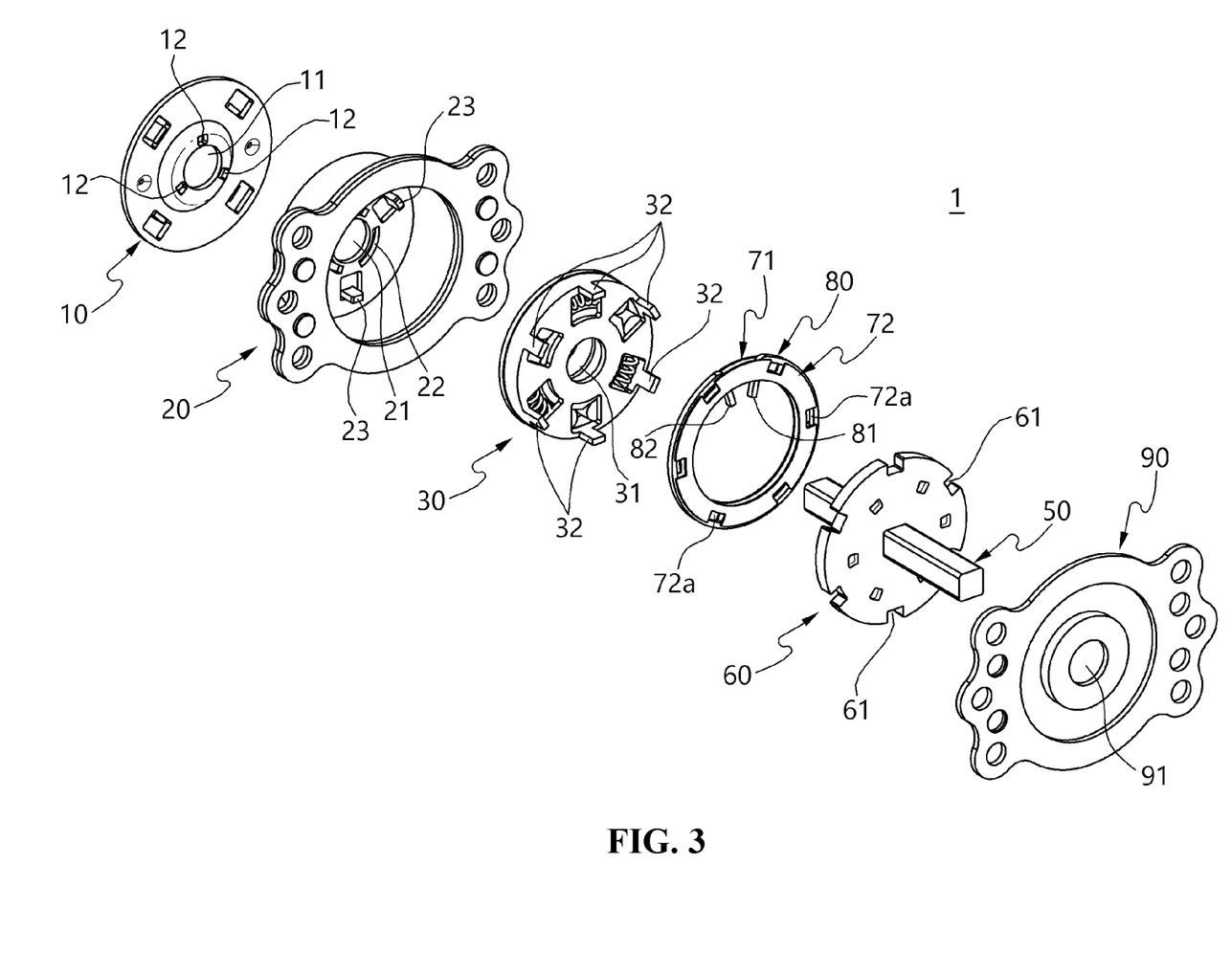
FIG. 3 is an exploded perspective view of the reclining device for a vehicle seat according to the exemplary embodiment of the present invention when viewed from a cover.

FIG. 2 is an exploded perspective view of the reclining device for a vehicle seat according to the exemplary embodiment of the present invention when viewed from a lever bracket, and FIG. 3 is an exploded perspective view of the reclining device for a vehicle seat according to the exemplary embodiment of the present invention when viewed from the cover.

As illustrated in FIGS. 2 and 3, the reclining device of the present invention includes a lever bracket 10, a housing 20 having one side directed toward a clutch drum 30 and opened to communicate with an interior of the housing 20, and the other side directed toward the lever bracket 10 and coupled to the lever bracket 10, the clutch drum 30 inserted into the housing 20 and having one side directed toward the housing 20 and opened to communicate with an interior of the clutch drum 30, a cam 40 inserted into the clutch drum 30, a plurality of elastic members provided in the clutch drum 30 and arranged along an inner/outer periphery of the clutch drum 30 so as to surround an outer periphery of the cam 40, a brake drum 60 inserted into the housing 20, coupled to the other side of the clutch drum 30, and having a center to which the shaft 50 is penetratively coupled, a holder 80 positioned between the clutch drum 30 and the brake drum 60 and coupled to a supporter, and the cover 90 coupled to one opened side of the housing 20 in a state in which the clutch drum 30 and the brake drum 60 are coupled in the housing 20.

A through-hole 11 is provided at a center of the lever bracket 10, and the shaft 50 is penetratively coupled to the through-hole 11. A plurality of coupling holes 12 is provided around the through-hole 11. For example, FIGS. 2 and 3 illustrate three coupling holes 12. However, the present invention is not limited thereto.

Coupling protrusions 42 of the cam 40 may penetrate long holes 22 of the housing 20 and be inserted and coupled into the coupling holes 12 of the lever bracket 10. For example, FIGS. 2 and 3 illustrate three coupling protrusions 42 of the cam 40 and three long holes 22 of the housing 20. However, the present invention is not limited thereto.

Protrusions 23 may protrude from an inner surface of the housing 20 directed toward the interior of the clutch drum 30. During an assembling process, the protrusions 23 of the housing may be provided between the elastic members arranged in the clutch drum 30.

A through-hole 21 is provided at a center of the housing 20, and the shaft 50 may be coupled to the through-hole 21. The long holes 22 may be provided around the through-hole 21. The long hole 22 may have a larger horizontal width than the coupling protrusion 42 of the cam so that the coupling protrusion 42 of the cam 40 coupled to the long hole 22 may rotate. For example, the long hole 22 may be formed in a circular arc shape.

The coupling protrusion 42 of the cam 40 may rotate within a range of the long hole 22 in the state in which the coupling protrusion 42 is inserted into the long hole 22 of the housing 20.

The coupling protrusion 42 of the cam 40 may be coupled while sequentially penetrating the long hole 22 of the housing 20 and the coupling hole 12 of the lever bracket 10.

The clutch drum 30 may rotate in a state in which the clutch drum 30 is inserted into the housing 20.

A through-hole 31 may be provided at a center of the clutch drum 30, and the shaft 50 may be penetratively coupled to the through-hole 31. The clutch drum 30 may have assembling protrusions 32 provided on the other surface directed toward the brake drum 60. The assembling protrusions 32 of the clutch drum 30 may protrude toward the brake drum 60 and be inserted and coupled into coupling grooves 61 provided along an outer-diameter portion of the brake drum 60.

Figure 5:
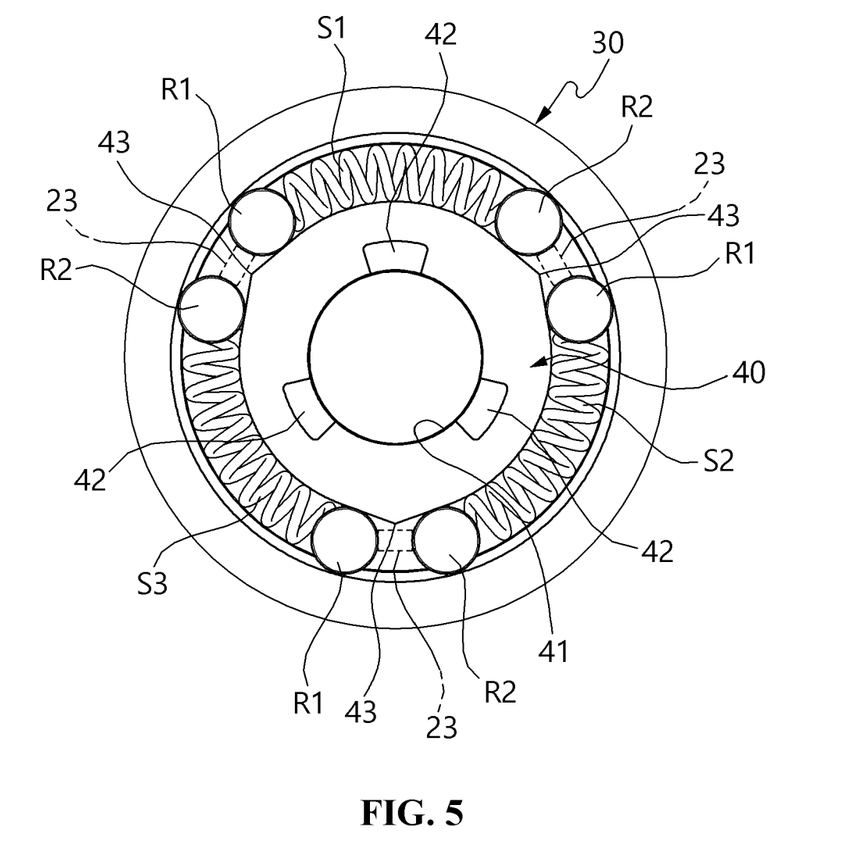
FIG. 5 is a view illustrating a cam and first to third elastic members coupled in a clutch drum according to the exemplary embodiment of the present invention.
Figure 6:
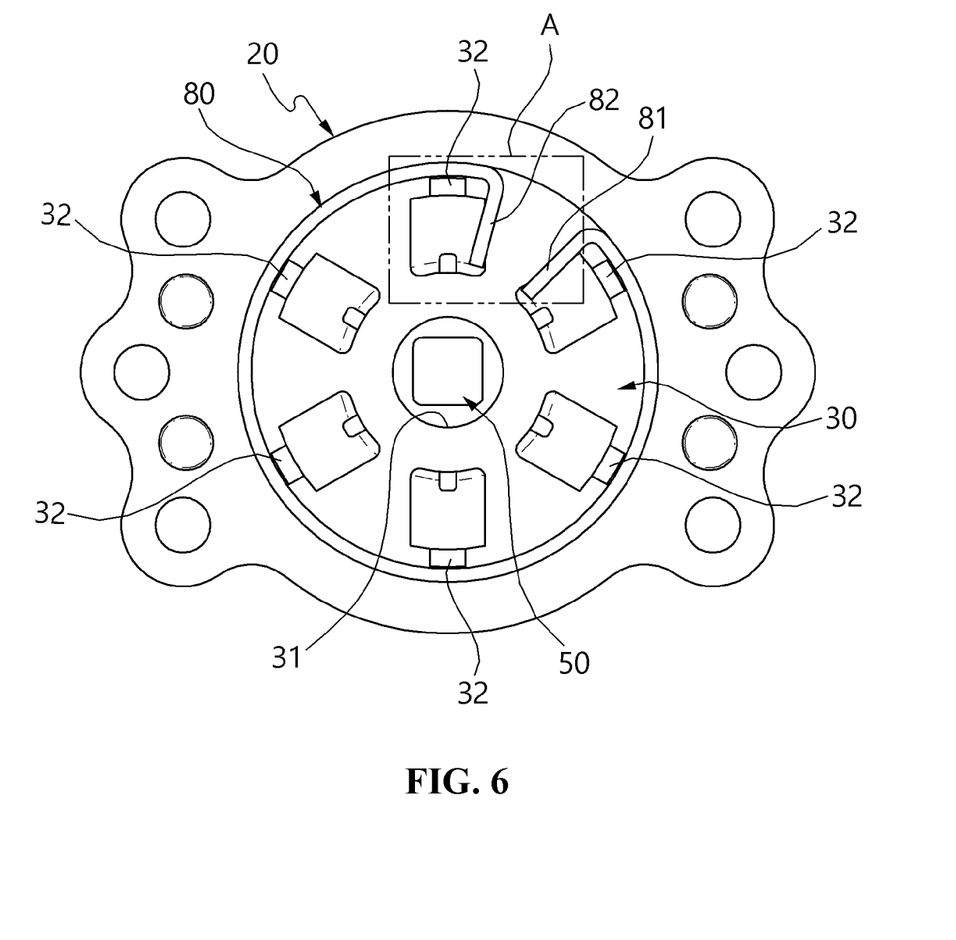
FIG. 6 is a view illustrating a state in which the clutch drum and a holder according to the exemplary embodiment of the present invention are coupled.
Figure 7:
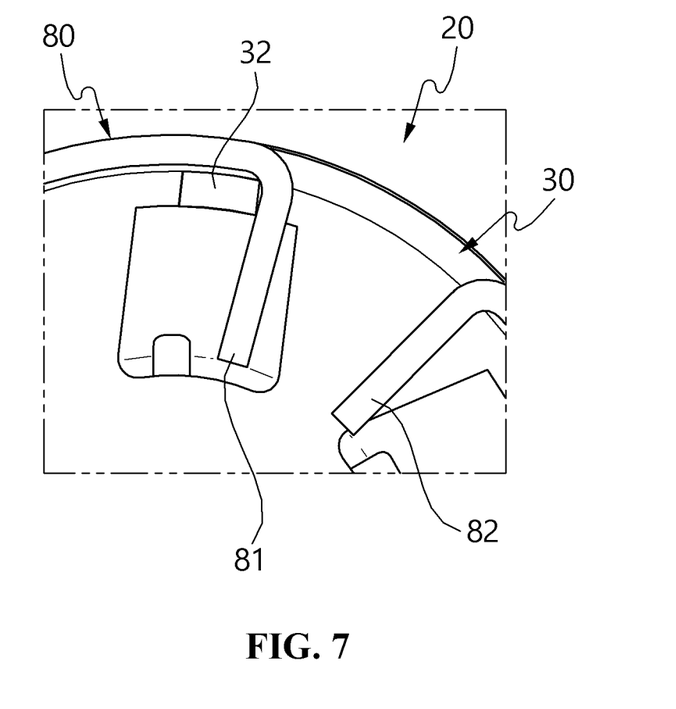
FIG. 7 is an enlarged view of part A in FIG. 6.
Figure 8:
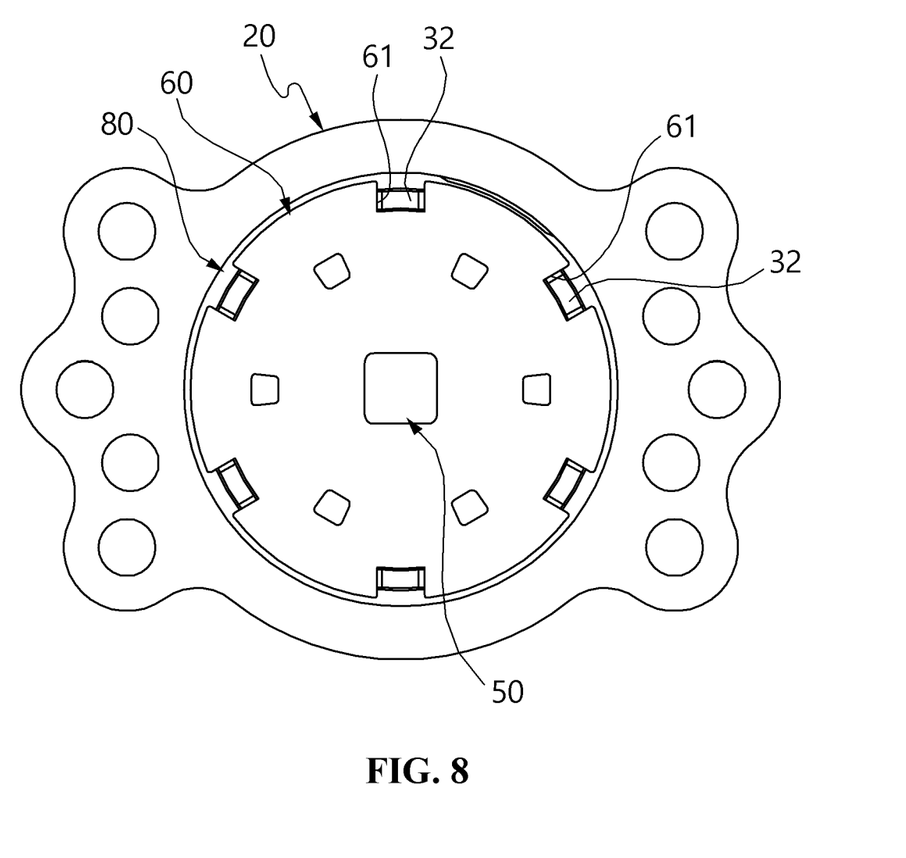
FIG. 8 is a view illustrating a state in which an assembling protrusion of the clutch drum is coupled to a coupling groove of a brake drum according to the exemplary embodiment of the present invention.

FIG. 5 is a view illustrating the cam and first to third elastic members coupled in the clutch drum according to the exemplary embodiment of the present invention, FIG. 6 is a view illustrating a state in which the clutch drum and the holder according to the exemplary embodiment of the present invention are coupled, FIG. 7 is an enlarged view of part A in FIG. 6, and FIG. 8 is a view illustrating a state in which the assembling protrusion of the clutch drum is coupled to the coupling groove of the brake drum according to the exemplary embodiment of the present invention.

As illustrated in FIGS. 5 to 8, the plurality of elastic members may be arranged at predetermined intervals in the clutch drum 30. For example, the elastic members include a first elastic member S1, a second elastic member S2, and a third elastic member S3. For example, the first elastic member S1, the second elastic member S2, and the third elastic member S3 may each be a return spring.

The first elastic member S1, the second elastic member S2, and the third elastic member S3 may be arranged along the inner/outer periphery of the clutch drum 30 so as to surround the outer periphery of the clutch drum 30.

A first roller R1 and a second roller R2 may be provided at one side and the other side of each of the first elastic member S1, the second elastic member S2, and the third elastic member S3.

The cam 40 may receive a rotational force of a lever (not illustrated) from the lever bracket 10 and transmit the rotational force to the clutch drum 30. A through-hole 41 may be provided at a center of the cam 40, and the shaft 50 may be penetratively coupled to the through-hole 41.

For example, when protruding portions 43, which are provided along the outer periphery of the cam 40, rotate and press the first rollers R1 or the second rollers R2 of the first elastic member S1, the second elastic member S2, and the third elastic member S3 that are positioned in the rotation direction, the first elastic member S1, the second elastic member S2, and the third elastic member S3 may be compressed.

For example, when the pressing forces of the first rollers R1, which have been applied to the first elastic member S1, the second elastic member S2, and the third elastic member S3 at the time of pressing the first rollers R1, are eliminated, the first elastic member S1, the second elastic member S2, and the third elastic member S3 may be extended to original states. Therefore, the cam 40 may rotate to an original position.

For example, during the assembling process, the protrusions 23 of the housing 20 may be positioned between the second roller R2 of the first elastic member S1 and the first roller R1 of the second elastic member S2, between the second roller R2 of the second elastic member S2 and the first roller R1 of the third elastic member S3, and between the second roller R2 of the third elastic member S3 and the first roller R1 of the first elastic member S1 (see FIG. 5).

When the protruding portions 43 of the cam 40 press one side of the first elastic member S1, one side of the second elastic member S2, and one side of the third elastic member S3 in the state in which the first elastic member S1, the second elastic member S2, and the third elastic member S3 are supported on the protrusions 23 of the housing 20 as described above, the first elastic member S1, the second elastic member S2, and the third elastic member S3 may be compressed while being pushed toward the protrusions 23 of the housing 20.

Because the protrusion 23 of the housing 20 is spaced apart from the protruding portion 43 of the cam 40 at an interval in a radial direction, the protruding portion 43 does not come into contact with the protrusion 23 of the housing 20 when the cam 40 rotates. Therefore, the cam 40 may smoothly rotate.

The shaft 50 coupled to a center of the brake drum 60 may be configured as a shaft 50 having an angular shape such as a quadrangular shape. Catching protrusions 62 may be provided on one surface of the brake drum 60 directed toward the clutch drum 30.

A rotational force of the lever, which is applied by an occupant in the vehicle, may be transmitted to the shaft 50 via the lever bracket 10, the cam 40, the clutch drum 30, and the brake drum 60.

The rotational force transmitted to the shaft 50 may be finally transmitted to the seatback CB of the recliner RC. Therefore, an angle of the seatback CB may be adjusted.

As illustrated in FIG. 6, the holder 80 may have a first end 81 and a second end 82 provided at one end and the other end thereof. The first end 81 and the second end 82 are disposed at an interval and face each other. The first end 81 and the second end 82 may be configured to be bent toward inner centers of first and second supporters 71 and 72.

During the assembling process, the first and second ends 81 and 82 of the holder 80 are positioned between the assembling protrusions 32 of the clutch drum 30. The holder 80 may be compressed when the assembling protrusion 32 of the clutch drum 30 press the first end 81 or the second end 82.

For example, when a rotational force of the lever bracket 10 is transmitted to the clutch drum 30 by the cam 40, the holder 80 may be compressed by the rotation of the clutch drum 30, and the brake drum 60 may rotate.

As illustrated in FIG. 7, when the clutch drum 30 rotates, the assembling protrusion 32 of the clutch drum 30 may press the second end 82 while coming into contact with the second end 82 of the holder 80. The second end 82 is pushed toward the first end 81 by the pressing force of the assembling protrusion 32, a distance between the first end 81 and the second end 82 decreases, such that the holder 80 may be compressed.

Because the assembling protrusions 32 are coupled to the coupling grooves 61, the rotational force of the clutch drum 30 may be transmitted to the brake drum 60, such that the brake drum 60 may rotate. When the brake drum 60 rotates, the shaft 50 mounted at the center of the brake drum 60 may rotate. The angle of the seatback CB connected to the shaft 50 may be adjusted by the rotation of the shaft 50 (see FIG. 8).

Figure 10:
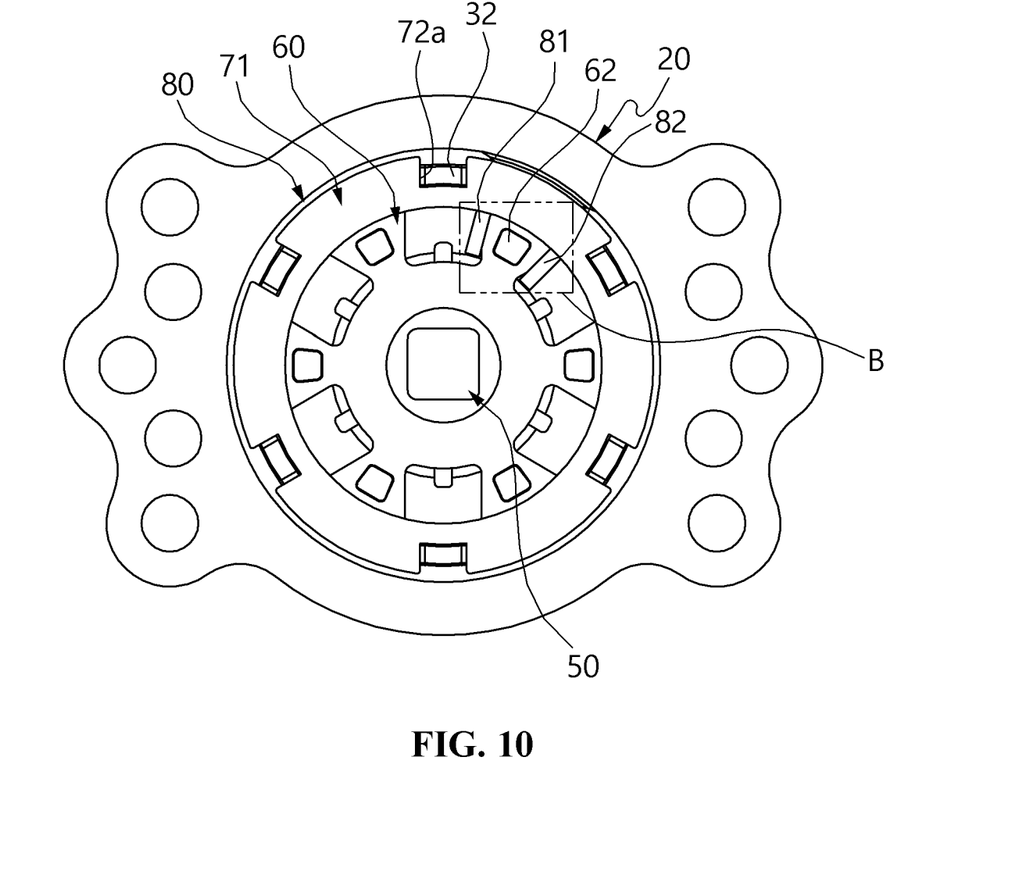
FIG. 10 is a view illustrating an operation of the brake drum during a reverse torque input according to the exemplary embodiment of the present invention.
Figure 11:
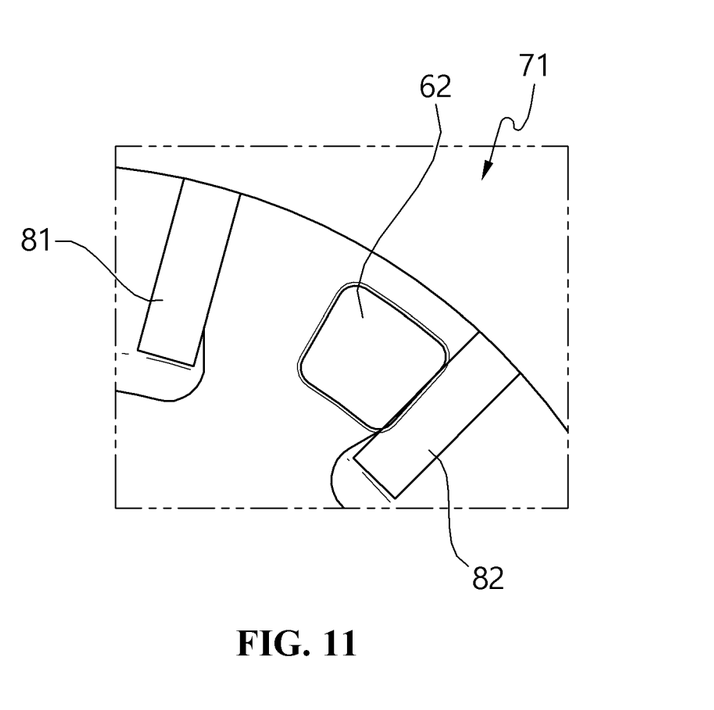
FIG. 11 is an enlarged view of part B in FIG. 10.

FIG. 10 is a view illustrating an operation of the brake drum during a reverse torque input according to the exemplary embodiment of the present invention, and FIG. 11 is an enlarged view of part B in FIG. 10.

As illustrated in FIG. 10, during the assembling process, the catching protrusions 62 of the brake drum 60 may be positioned between the first and second ends 81 and 82 of the holder 80. When the brake drum 60 rotates, the catching protrusion 62 may press the first end 81 or the second end 82.

As illustrated in FIG. 11, in case that torque is reversely inputted to the shaft 50, the catching protrusion 62 of the brake drum 60, which is positioned between the first end 81 and the other end 82 of the holder 80, may be caught by the first end 81 of the holder 80 positioned in the rotation direction, such that the rotation of the brake drum 60 may be restricted.

Figure 12:
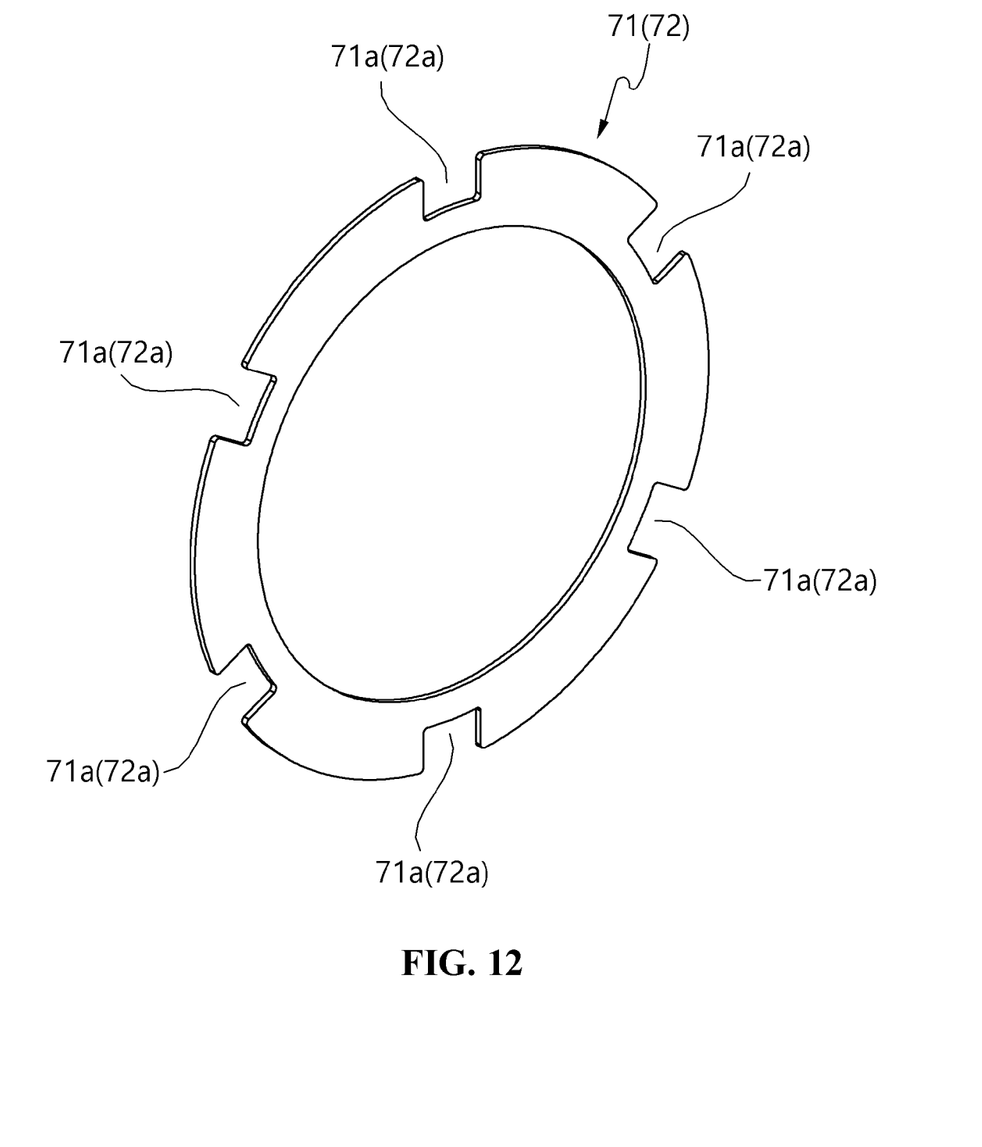
FIG. 12 is an enlarged view of first and second supporters according to the exemplary embodiment of the present invention.
Figure 13:
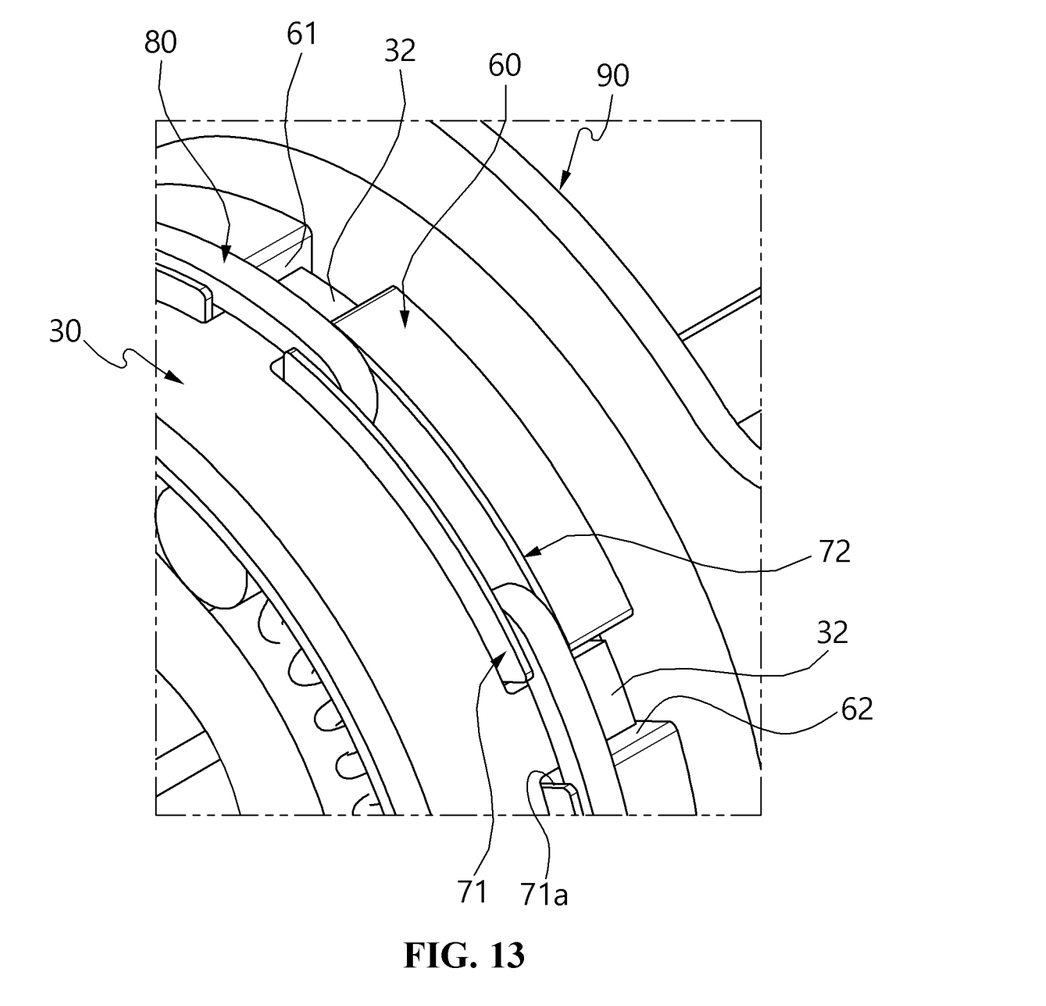
FIG. 13 is a perspective view illustrating a coupled state of the first and second supporters according to the exemplary embodiment of the present invention.
Figure 14:
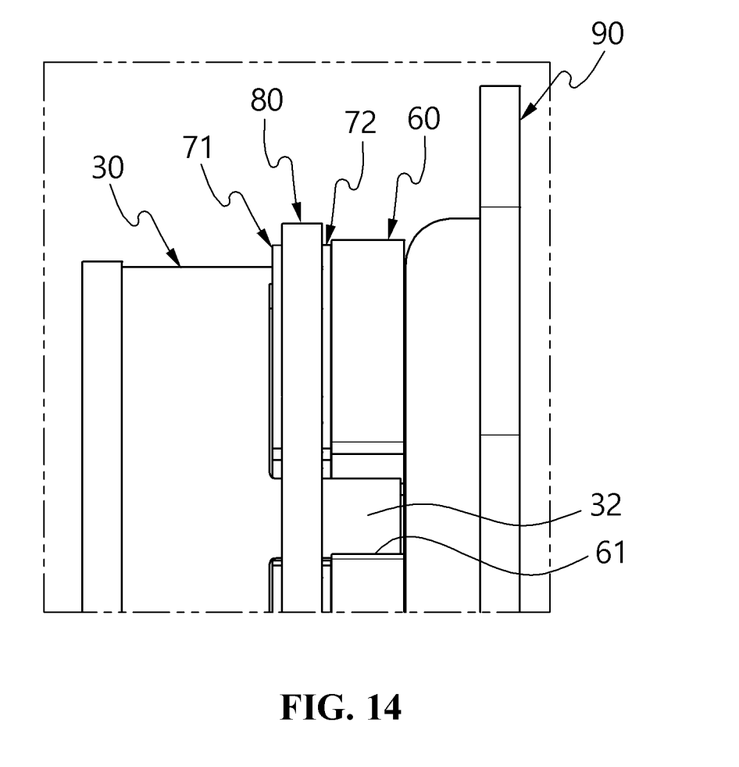
FIG. 14 is a side view illustrating a coupled state of the first and second supporters according to the exemplary embodiment of the present invention.

FIG. 12 is an enlarged view of the first and second supporters according to the exemplary embodiment of the present invention, FIG. 13 is a perspective view illustrating a coupled state of the first and second supporters according to the exemplary embodiment of the present invention, and FIG. 14 is a side view illustrating a coupled state of the first and second supporters according to the exemplary embodiment of the present invention.

As illustrated in FIGS. 12 to 14, a support positioned between the clutch drum 30 and the brake drum 60 may include the first supporter 71 and the second supporter 72, i.e., a pair of left and right supporters. The first supporter 71 and the second supporter 72 may each have a circular ring shape.

Assembling grooves 71a may be provided along an outer-diameter portion of the first supporter 71. Assembling grooves 72a may be provided along an outer-diameter portion of the second supporter 72 and coincident with the assembling grooves 71a of the first supporter 71.

The assembling protrusions 32 of the clutch drum 30 may penetrate the assembling grooves 71a of the first supporter 71 and the assembling grooves 72a of the second supporter 72 and be inserted and coupled into the coupling grooves 61 of the brake drum 60.

The holder 80 may be positioned between the first supporter 71 and the second supporter 72. The holder 80 may be positioned between the clutch drum 30 and the brake drum 60 in a state in which the holder 80 is in close contact with the first supporter 71 and the second supporter 72.

The first supporter 71 and the second supporter 72 support two opposite sides of the holder 80 and prevent the holder 80 from being withdrawn in an axial direction.

Next, the operation of the present invention during a forward torque input when an operating force of the lever applied by the occupant in the vehicle is transmitted to the lever bracket will be described.

Figure 4:
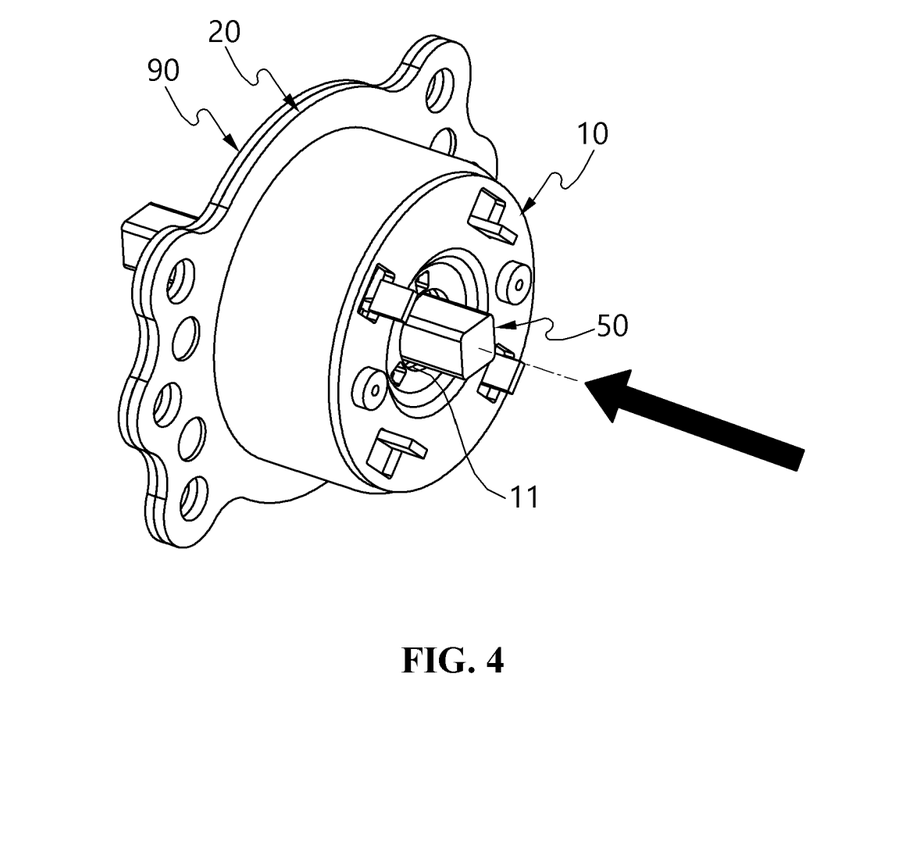
FIG. 4 is a view illustrating a forward torque input according to the exemplary embodiment of the present invention.

FIG. 4 is a view illustrating a forward torque input according to the exemplary embodiment of the present invention.

As indicated by the arrow in FIG. 4, the operating force of the lever applied by the occupant in the vehicle may be transmitted to the lever bracket 10.

As illustrated in FIGS. 5 to 8, because the coupling protrusions 42 of the cam 40 are coupled to the coupling holes 12 of the lever bracket 10, the cam 40 in the clutch drum 30 may rotate in conjunction with the rotation of the lever bracket 10 when the lever bracket 10 rotates.

When the cam 40 rotates, the protruding portions 43 of the cam 40 press the first rollers R1 or the second rollers R2 at the two opposite ends of the first elastic member S1, the second elastic member S2, and the third elastic member S3 positioned in the rotation direction. Therefore, the clutch drum 30 may rotate.

For example, when the protruding portions 43 of the cam 40 press the first rollers R1 of the first elastic member S1, the second elastic member S2, and the third elastic member S3 positioned in the rotation direction, the first elastic member S1, the second elastic member S2, and the third elastic member S3 may be pushed from the first rollers R1 toward the second rollers R2 supported by the protrusions 23 of the housing 20, such that the lengths of the first elastic member S1, the second elastic member S2, and the third elastic member S3 may decrease.

The rotational force of the cam 40 may be transmitted to the clutch drum 30, and the rotational force transmitted to the clutch drum 30 may be transmitted to the brake drum 60.

When the first elastic member S1, the second elastic member S2, and the third elastic member S3 are maximally compressed, the cam 40 does not rotate any further in the same direction. In this state, when the occupant in the vehicle releases the rotational force of the lever, the first elastic member S1, the second elastic member S2, and the third elastic member S3, which have been compressed, are extended to the original states, such that the cam 40 may rotate to the original position.

The clutch drum 30 and the brake drum 60 may be gradually rotated in a desired rotation direction by the above-mentioned repeated operations.

Because the assembling protrusions 32 of the clutch drum 30 penetrate the assembling grooves 71a of the first supporter 71 and the assembling grooves 72a of the second supporter 72 and are coupled to the coupling grooves 61 of the brake drum 60, the brake drum 60 may rotate in conjunction with the rotation of the clutch drum 30.

When the brake drum 60 rotates, the shaft 50 coupled to the brake drum 60 may rotate.

With the structure in which the shaft 50 passes through a through-hole 91 of the cover 90 and is connected to the seatback CB, the angle of the seatback CB may be adjusted to a desired angle by the rotation of the shaft 50.

Meanwhile, when the clutch drum 30 and the brake drum 60 rotate, the first supporter 71 and the second supporter 72 serve to prevent the holder 80, which is positioned between the clutch drum 30 and the brake drum 60, from being withdrawn in the axial direction and to surround and protect the two opposite sides of the holder 80.

The first supporter 71 may be in contact with the clutch drum 30, and the second supporter 72 may be in contact with the brake drum 60, thereby preventing the holder 80 from coming into direct contact with the clutch drum 30 and the brake drum 60.

Next, the operation of the present invention during a reverse torque input when torque is inputted to the shaft will be described.

Figure 9:
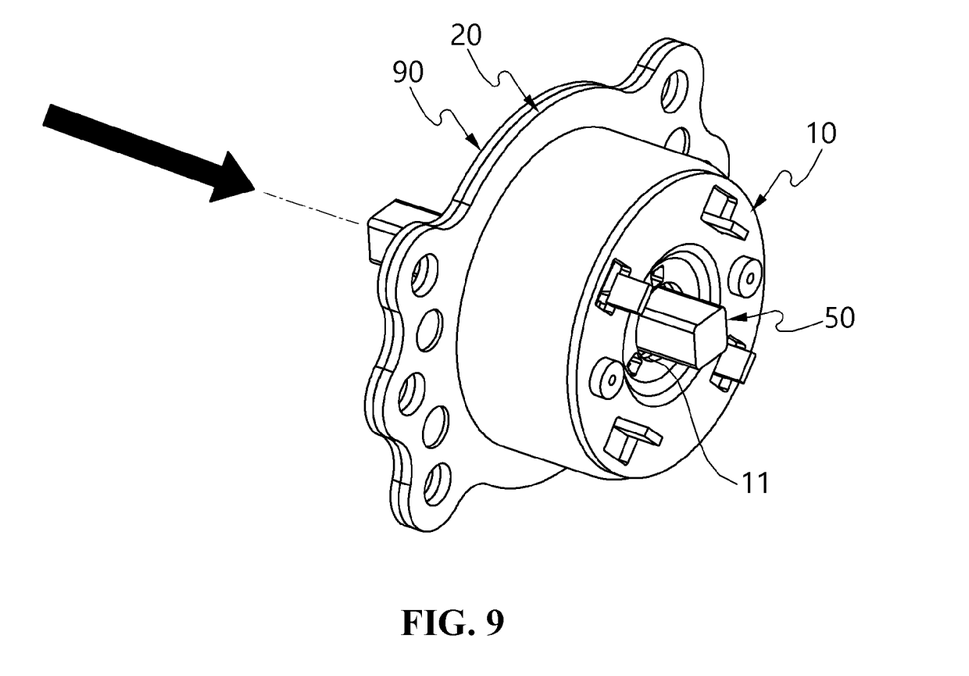
FIG. 9 is a view illustrating a reverse torque input according to the exemplary embodiment of the present invention.

FIG. 9 is a view illustrating a reverse torque input according to the exemplary embodiment of the present invention.

As indicated by the arrow in FIG. 9, reverse torque may be inputted through the shaft 50.

As illustrated in FIGS. 10 and 11, when torque is reversely inputted to the shaft 50 in a state in which the operating force of the lever is not transmitted to the lever bracket 10, the rotational force of the shaft 50 may be transmitted to the brake drum 60.

When the brake drum 60 rotates, the catching protrusion 62 of the brake drum 60, which is positioned between the first end 81 and the second end 82 of the holder 80, may be caught by the second end 82 of the holder 80, as illustrated in FIG. 11, such that the rotation of the brake drum 60 may be restricted.

As described above, according to the present invention, the angle of the seatback may be adjusted when torque is inputted to the lever bracket by the operation of the lever, and the rotation of the brake drum may be restrained by the holder when torque is reversely inputted to the shaft coupled to the brake drum. In addition, the present invention may provide the lever-type reclining device capable of providing the occupant in the vehicle with the convenience of the reclining operation.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A reclining device for a vehicle seat, the reclining device comprising:
   a housing having one side opened to communicate with an interior of the housing;
   a clutch drum rotatably disposed in the housing and having one side directed toward the housing and opened to communicate with an interior of the clutch drum;
   a cam disposed in the clutch drum and configured to receive a rotational force from an outside of the housing and to transmit the rotational force to the clutch drum; and
   a brake drum configured to receive the rotational force from the clutch drum and having a center to which a shaft is coupled,
   wherein the cam includes a plurality of coupling protrusions disposed on one surface of the cam directed toward the housing, and the plurality of coupling protrusions penetrate another side of the housing to be inserted into coupling holes of a lever bracket,
   wherein elastic members, each having rollers disposed at two opposite sides thereof, are arranged along an inner/outer periphery of the clutch drum to surround an outer periphery of the cam,
   wherein the cam includes first protruding portions disposed along the outer periphery of the cam, and
   wherein when the cam rotates, the first protruding portions are configured to press the rollers of the elastic members positioned in a rotation direction, such that the elastic members are compressed.

2. The reclining device of claim 1, wherein the housing includes a second protruding portions protruding from the housing and positioned between the elastic members.

3. The reclining device of claim 1, wherein the clutch drum includes a plurality of assembling protrusions disposed on a surface thereof directed toward the brake drum, and the plurality of assembling protrusions are configured to be inserted into assembling grooves defined along an outer periphery of the brake drum.

4. The reclining device of claim 3, wherein a holder, which has two opposite sides surrounded by first and second supporters, is positioned between the clutch drum and the brake drum, and the holder includes first and second ends bent toward inner centers of the first and second supporters.

5. The reclining device of claim 4, wherein the first and second supporters include assembling grooves defined along outer peripheries thereof, and the plurality of assembling protrusions of the clutch drum are configured to be inserted into the assembling grooves of the first and second supporters.

6. The reclining device of claim 4, wherein when the clutch drum rotates, at least one of the plurality of assembling protrusions is configured to press at least one of the first and second ends of the holder so that a distance between the first and second ends decreases.

7. The reclining device of claim 4, wherein the brake drum includes catching protrusions disposed on a surface thereof directed toward the clutch drum, and at least one of the catching protrusions is positioned between the first and second ends of the holder.

8. The reclining device of claim 7, wherein when the brake drum, which is configured to receive a rotational force from the shaft when torque is transmitted to the shaft, rotates, the at least one of the catching protrusions positioned between the first and second ends is configured to be caught by at least one of the first and second ends, such that rotation is restricted.

9. The reclining device of claim 1, wherein a cover is coupled to the one side of the housing in a state in which the clutch drum and the brake drum are coupled in the housing.

10. The reclining device of claim 9, wherein through-holes, to which the shaft is coupled, are defined at a center of the lever bracket, a center of the housing, a center of the cam, a center of the clutch drum, and a center of the cover.

* * * * *